US012684016B2

(12) United States Patent
Glistvain

(10) Patent No.: US 12,684,016 B2
(45) Date of Patent: Jul. 14, 2026

(54) TRANSPORT LAYER SECURITY STACK FOR RESOURCE CONSTRAINED DEVICES

(71) Applicant: Turck Inc., Plymouth, MN (US)

(72) Inventor: Roman Glistvain, Plymouth, MN (US)

(73) Assignee: Turck Inc., Plymouth, MN (US)

( * ) Notice: Subject to any disclaimer, the term of this patent is extended or adjusted under 35 U.S.C. 154(b) by 109 days.

(21) Appl. No.: 18/374,615

(22) Filed: Sep. 28, 2023

(65) Prior Publication Data

US 2025/0112958 A1 Apr. 3, 2025

(51) Int. Cl.
*H04L 9/40* (2022.01)

(52) U.S. Cl.
CPC ........ *H04L 63/166* (2013.01); *H04L 63/0876* (2013.01); *H04L 63/20* (2013.01)

(58) Field of Classification Search
CPC ... H04L 63/0428; H04L 63/08; H04L 63/061; H04L 67/02; H04L 67/306; H04L 63/0861; H04L 63/102; H04L 65/60; H04L 9/0819; H04L 63/166; G06F 21/10; G06F 21/602; G06F 2221/2107; G06F 17/30867; G06F 21/105; H04N 21/4627; H04N 21/84;
(Continued)

(56) References Cited

U.S. PATENT DOCUMENTS 7,587,598 B2 * 9/2009 Ohba ...................... H04L 63/08
713/169
7,917,758 B2 * 3/2011 Palekar ................... H04L 63/08
709/227
(Continued)

*Primary Examiner* — Sharif E Ullah
(74) *Attorney, Agent, or Firm* — Pearl Cohen Patentanwälte PartGmbB; Michael McCandlish

(57) ABSTRACT
Embodiments of the present disclosure include a system for performing authentication. The system can include a computing device comprising processor resources and memory resources, the memory resources storing computer-readable instructions that can be executed by the processor resources to perform various functions. In some embodiments, instructions can be executed by the processor to receive, with a transport layer security stack, a first transport layer security request from a first internal communication endpoint task and a second transport layer security request from a second internal communication endpoint task, wherein the first transport layer security request is related to establishing a secure connection with a first external communication endpoint and the second transport layer security request is related to establishing a secure connection with a second external communication endpoint. In some embodiments, instructions can be executed by the processor to perform a first series of authentication steps with the server related to the first transport layer security request. In some embodiments, instructions can be executed by the processor to determine whether to establish the secure connection between the first external communication endpoint and the server in response to completion of the first series of authentication steps. In some embodiments, instructions can be executed by the processor to perform a second series of authentication steps with the server related to the second transport layer security request, in response to completion of the first series of authentication steps.

33 Claims, 6 Drawing Sheets

(58) Field of Classification Search
CPC ........... H04N 21/2353; H04N 21/2387; H04N 21/25816; H04N 21/233; H04N 21/23439; H04N 21/2393; H04N 21/4126; H04N 21/41407; G06N 3/086
USPC ........... 726/2, 4, 21, 36; 713/150, 163, 181; 380/255, 264, 276
See application file for complete search history.

(56)                References Cited

U.S. PATENT DOCUMENTS

| | | | | |
|---|---|---|---|---|
| 8,484,713 | B1 | 7/2013 | Ravishankar et al. | |
| 8,843,738 | B2 * | 9/2014 | Vos | H04L 69/22 |
| | | | | 709/224 |
| 9,026,784 | B2 * | 5/2015 | Buruganahalli | H04L 63/20 |
| | | | | 713/176 |
| 9,608,963 | B2 * | 3/2017 | Lu | H04L 63/0464 |
| 10,009,183 | B2 * | 6/2018 | Pahl | H04L 9/3247 |
| 10,162,943 | B2 * | 12/2018 | Park | H04L 63/08 |
| 11,438,147 | B2 * | 9/2022 | Afanasyeva | H04L 9/3252 |
| 11,502,830 | B2 * | 11/2022 | Cannon | H04L 9/0819 |
| 2003/0174842 | A1 * | 9/2003 | Challener | H04L 63/061 |
| | | | | 380/277 |
| 2005/0132204 | A1 * | 6/2005 | Gouguenheim | G06F 21/10 |
| | | | | 713/193 |
| 2007/0057048 | A1 * | 3/2007 | Plotkin | H04L 63/0428 |
| | | | | 235/382 |
| 2008/0109642 | A1 * | 5/2008 | Beutler | G06F 11/1637 |
| | | | | 712/225 |
| 2008/0212504 | A1 * | 9/2008 | Venkataraman | H04L 67/12 |
| | | | | 370/310 |
| 2009/0328177 | A1 * | 12/2009 | Frey | H04L 9/3213 |
| | | | | 726/9 |
| 2010/0017615 | A1 * | 1/2010 | Boesgaard | G06F 21/606 |
| | | | | 713/176 |
| 2010/0257578 | A1 * | 10/2010 | Shukla | G06F 21/6218 |
| | | | | 726/1 |
| 2011/0145581 | A1 * | 6/2011 | Malhotra | H04L 9/3271 |
| | | | | 725/91 |
| 2012/0324552 | A1 * | 12/2012 | Padala | H04L 9/3213 |
| | | | | 726/6 |
| 2013/0198509 | A1 * | 8/2013 | Buruganahalli | H04L 63/1408 |
| | | | | 713/151 |
| 2013/0219178 | A1 * | 8/2013 | Xiques | H04L 65/70 |
| | | | | 713/168 |
| 2013/0318358 | A1 * | 11/2013 | Wang | H04L 9/0866 |
| | | | | 713/182 |
| 2014/0079221 | A1 * | 3/2014 | McCallum | H04L 9/0822 |
| | | | | 380/277 |
| 2014/0331297 | A1 * | 11/2014 | Innes | H04L 63/0884 |
| | | | | 726/7 |
| 2015/0222697 | A1 * | 8/2015 | Bassiouny | H04L 65/65 |
| | | | | 709/203 |
| 2017/0316185 | A1 * | 11/2017 | Park | G06F 21/105 |
| 2017/0339130 | A1 * | 11/2017 | Reddy | H04L 63/0823 |
| 2020/0058341 | A1 * | 2/2020 | Villa | G11C 11/2257 |
| 2020/0169584 | A1 * | 5/2020 | Penner | H04L 63/166 |
| 2022/0060450 | A1 * | 2/2022 | Slovetskiy | H04L 67/142 |
| 2022/0232043 | A1 * | 7/2022 | Penner | H04L 63/168 |

* cited by examiner

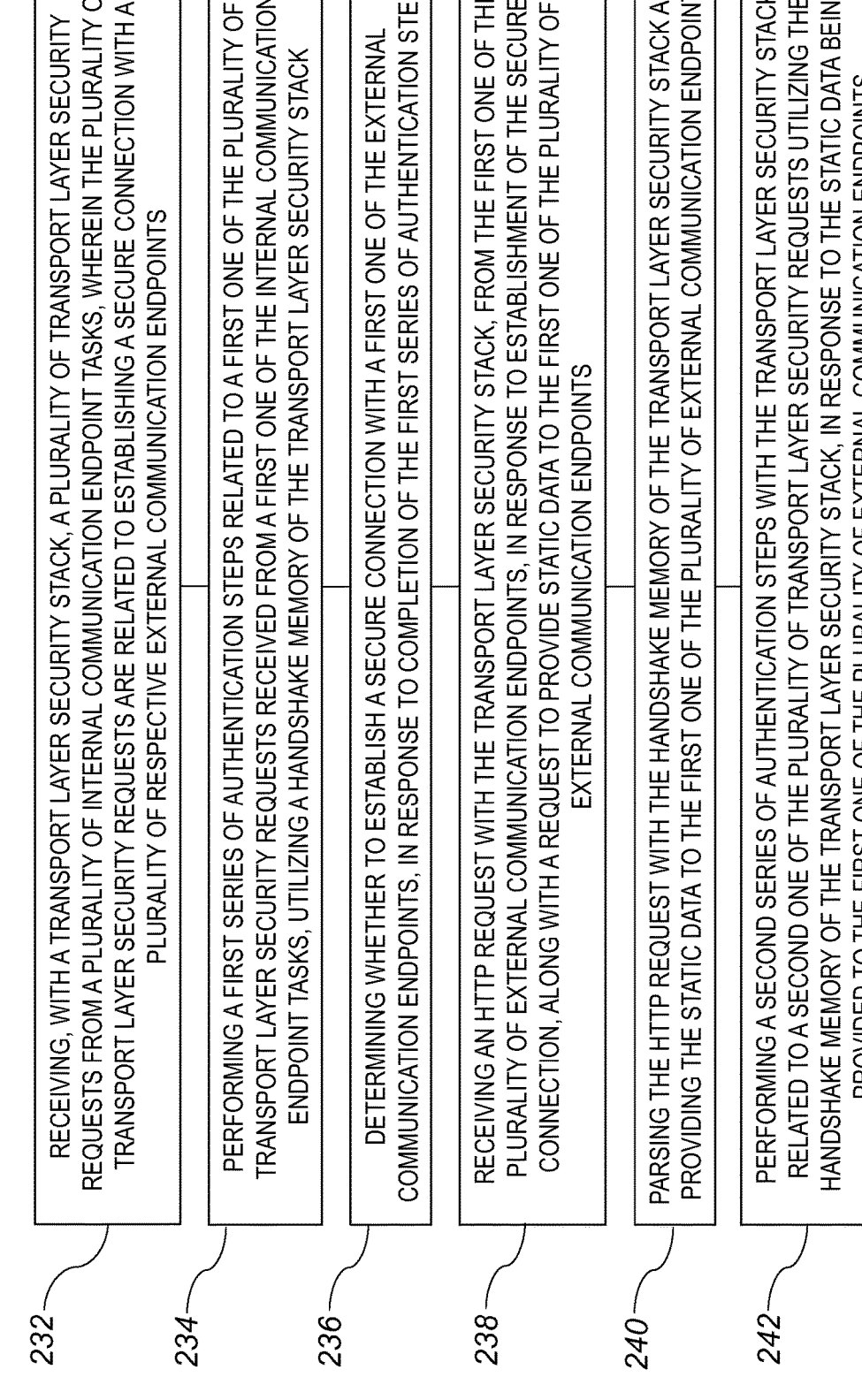

230

232 RECEIVING, WITH A TRANSPORT LAYER SECURITY STACK, A PLURALITY OF TRANSPORT LAYER SECURITY REQUESTS FROM A PLURALITY OF INTERNAL COMMUNICATION ENDPOINT TASKS, WHEREIN THE PLURALITY OF TRANSPORT LAYER SECURITY REQUESTS ARE RELATED TO ESTABLISHING A SECURE CONNECTION WITH A PLURALITY OF RESPECTIVE EXTERNAL COMMUNICATION ENDPOINTS

234 PERFORMING A FIRST SERIES OF AUTHENTICATION STEPS RELATED TO A FIRST ONE OF THE PLURALITY OF TRANSPORT LAYER SECURITY REQUESTS RECEIVED FROM A FIRST ONE OF THE INTERNAL COMMUNICATION ENDPOINT TASKS, UTILIZING A HANDSHAKE MEMORY OF THE TRANSPORT LAYER SECURITY STACK

236 DETERMINING WHETHER TO ESTABLISH A SECURE CONNECTION WITH A FIRST ONE OF THE EXTERNAL COMMUNICATION ENDPOINTS, IN RESPONSE TO COMPLETION OF THE FIRST SERIES OF AUTHENTICATION STEPS

238 RECEIVING AN HTTP REQUEST WITH THE TRANSPORT LAYER SECURITY STACK, FROM THE FIRST ONE OF THE PLURALITY OF EXTERNAL COMMUNICATION ENDPOINTS, IN RESPONSE TO ESTABLISHMENT OF THE SECURE CONNECTION, ALONG WITH A REQUEST TO PROVIDE STATIC DATA TO THE FIRST ONE OF THE PLURALITY OF EXTERNAL COMMUNICATION ENDPOINTS

240 PARSING THE HTTP REQUEST WITH THE HANDSHAKE MEMORY OF THE TRANSPORT LAYER SECURITY STACK AND PROVIDING THE STATIC DATA TO THE FIRST ONE OF THE PLURALITY OF EXTERNAL COMMUNICATION ENDPOINTS

242 PERFORMING A SECOND SERIES OF AUTHENTICATION STEPS WITH THE TRANSPORT LAYER SECURITY STACK RELATED TO A SECOND ONE OF THE PLURALITY OF TRANSPORT LAYER SECURITY REQUESTS UTILIZING THE HANDSHAKE MEMORY OF THE TRANSPORT LAYER SECURITY STACK, IN RESPONSE TO THE STATIC DATA BEING PROVIDED TO THE FIRST ONE OF THE PLURALITY OF EXTERNAL COMMUNICATION ENDPOINTS

FIG. 5

TRANSPORT LAYER SECURITY STACK FOR RESOURCE CONSTRAINED DEVICES

BACKGROUND a. Field of the Invention

The present disclosure relates generally to transport layer security stack for resource constrained devices.

b. Background Art

Transport Layer Security (TLS) is a protocol that ensures privacy and data integrity in communications between a client and a server. TLS can utilize a TLS handshake protocol, which enables the server and client to authenticate each other and to negotiate an encryption algorithm and cryptographic keys before data is exchanged. Most TLS stacks designed for microcontrollers require many tens of kilobytes for each TLS connection. Many industrial applications require multiple concurrent TLS connections to be available on each device (e.g., HTTPS, MQTT, OPCUA). When a microcontroller has less than, for example, 200 kb of RAM and is required to run standard industrial protocols in addition to cloud connections, this becomes a major challenge to support cloud connectivity.

Additionally, many microcontrollers utilize hypertext transport protocol secure (HTTPS) in communication with client web browsers, adding encryption and authentication using TLS to protect data exchanged between a web server associated with the microcontroller and a client's web browser. All HTTPS web traffic uses TLS protocol for encryption. To use HTTPS, the web server first needs a digital certificate that establishes the identity and authenticity of the site's owner. The web server and the client's web browser conduct a brief handshake where the browser verifies the server's certificate, and they work together to generate a temporary session encryption key. This key encrypts and decrypts all traffic between the server and the client, protecting it from any eavesdropping or attacks. The initial operations associated with the handshake can be a memory intensive process, especially for the aforementioned microcontroller.

SUMMARY

Embodiments of the present disclosure include a system for performing authentication. The system can include a computing device comprising processor resources and memory resources, the memory resources storing computer-readable instructions that can be executed by the processor resources to perform various functions. In some embodiments, the instructions can be executed by the processor resources to receive, with a transport layer security stack of the computing device, a first transport layer security request from a first internal communication endpoint task and a second transport layer security request from a second internal communication endpoint task, wherein the first transport layer security request is related to establishing a secure connection with a first external communication endpoint and the second transport layer security request is related to establishing a secure connection with a second external communication endpoint. In some embodiments, the instructions can be executed by the processor resources to perform a first series of authentication steps with the transport layer security stack related to the first transport layer security request. In some embodiments, the instructions can be executed by the processor resources to determine whether to establish the secure connection between the first external communication endpoint and the computing device in response to completion of the first series of authentication steps. In some embodiments, the instructions can be executed by the processor resources to perform a second series of authentication steps with the transport layer security stack related to the second transport layer security request, in response to completion of the first series of authentication steps.

Embodiments of the present disclosure can include a non-transitory computer readable medium storing instructions for performing authentication. In some embodiments, the instructions can be executable by a processor to receive, with a transport layer security stack transport layer security stack of a microcontroller, a first transport layer security request from a first transport layer security stack of a microcontroller and a second transport layer security request from a second internal communication endpoint task, wherein the first transport layer security request is related to establishing a secure connection with a first external communication endpoint and the second transport layer security request is related to establishing a secure connection with a second external communication endpoint. In some embodiments, the instructions can be executable by a processor to perform a first series of authentication steps related to the first transport layer security request, utilizing a handshake memory of the transport layer security stack. In some embodiments, the instructions can be executable by a processor to determine whether to establish a secure connection with the first external communication endpoint in response to completion of the first series of authentication steps. In some embodiments, the instructions can be executable by a processor to perform a second series of authentication steps related to the second transport layer security request utilizing the handshake memory of the transport layer security stack, in response to completion of the first series of authentication steps.

Embodiments of the present disclosure can include a method for performing authentication. In some embodiments, the method can include receiving, with a transport layer security stack, a plurality of transport layer security requests from a plurality of internal communication endpoint tasks, wherein the plurality of transport layer security requests are related to establishing a secure connection with a plurality of respective external communication endpoints. In some embodiments, the method can include performing a first series of authentication steps related to a first one of the plurality of transport layer security requests received from a first one of the internal communication endpoint tasks, utilizing a handshake memory of the transport layer security stack. In some embodiments, the method can include determining whether to establish a secure connection with a first one of the plurality of external communication endpoints in response to completion of the first series of authentication steps. In some embodiments, the method can include receiving an HTTP request with the transport layer security stack, from the first one of the plurality of external communication endpoints, in response to establishment of the secure connection, along with a request to provide static data to the first one of the plurality of external communication endpoints. In some embodiments, the method can include parsing the HTTP request with the handshake memory of the transport layer security stack and providing the static data to the first one of the plurality of external communication endpoints. In some embodiments, the method can include performing a second series of authentication steps with the transport layer security stack related to a second one of the plurality of transport layer security requests utilizing the handshake memory of the transport layer security stack, in response to the static data being provided to the first one of the plurality of external communication endpoints.

BRIEF DESCRIPTION OF THE DRAWINGS

FIG. 5 depicts a method flow diagram for performing authentication, in accordance with embodiments of the present disclosure.

DETAILED DESCRIPTION

Figure 1:
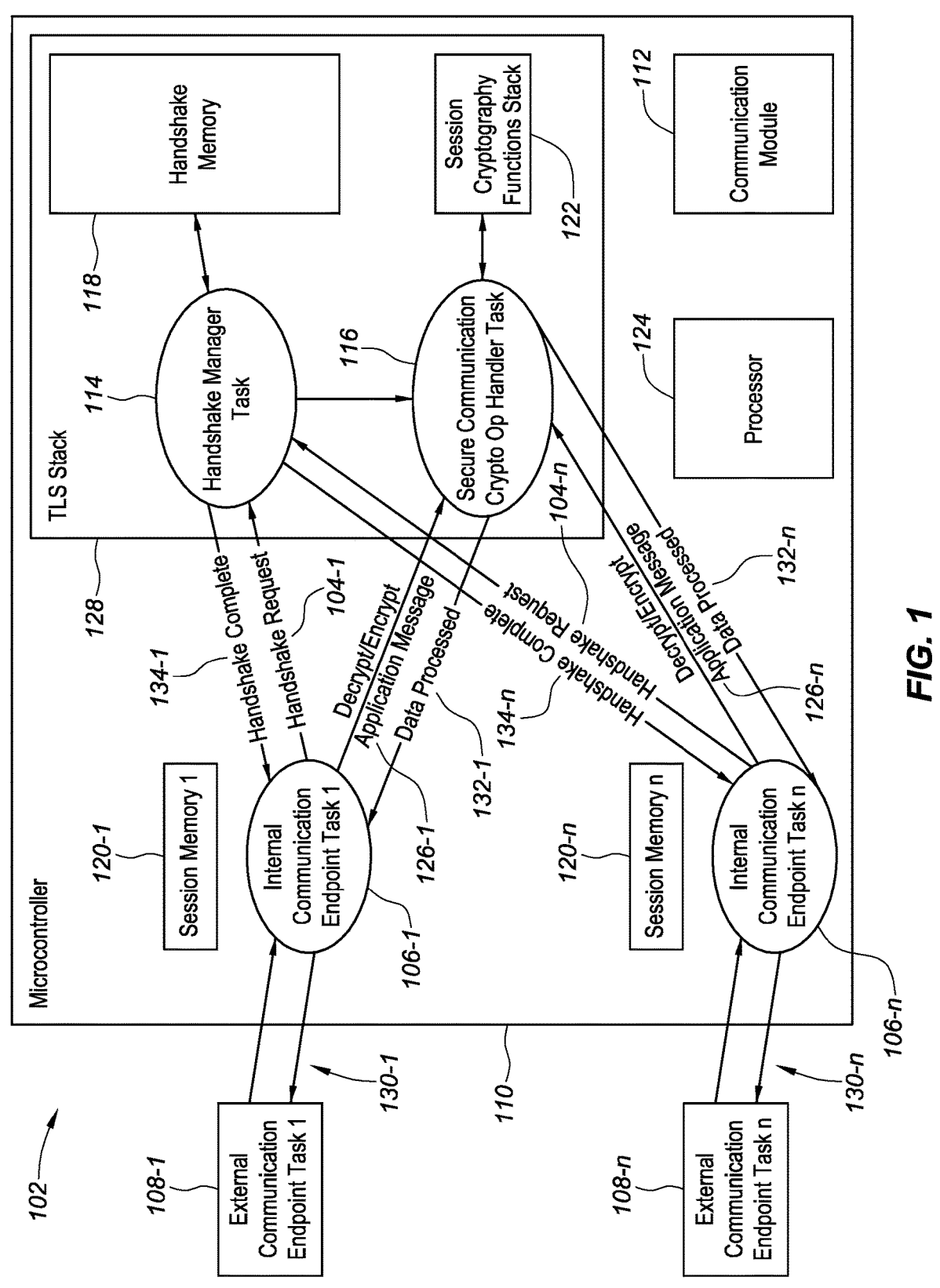
FIG. 1 depicts a system utilizing transport layer security (TLS), in accordance with embodiments of the present disclosure.

A microcontroller can include an integrated circuit that provides for control over an electronic device. A microcontroller can include a processor; volatile memory (e.g., random access memory (RAM)), non-volatile memory (E.g., flash memory), an input/output (I/O) interface, and/or wireless communications, which can allow for the microcontroller to act in the capacity of a server. In some embodiments, microcontrollers can be used to control functions of embedded systems, which can be a combination of computer hardware and software designed for a specific function. Embedded systems can be included in numerous consumer and commercial devices alike, including industrial equipment, automobiles, airplanes, mobile devices, etc. A microcontroller can be embedded inside of these devices, providing for control over particular functions in the device by interpreting data received via its I/O interface using its processor. Temporary data received by the microcontroller can be stored on the volatile memory associated with the microcontroller and the data can be accessed by the processor, which uses instructions stored on the non-volatile memory to perform one or more operations on the data. One or more actions can then be taken and/or communications made via the I/O interface, depending on the one or more actions performed on the data.

As mentioned, in some embodiments, microcontrollers can host a server, providing a user interface to an end user via a communication module that provides for connectivity (e.g., wireless communications) with respect to the microcontroller. Communications between the microcontroller (e.g., server) and the end user can be secured using methodologies that include transport layer security (TLS) and/or hypertext transport protocol secure (HTTPS). However, one inherent consideration with the use of such secured methodologies is the amount of volatile memory that is required when using TLS and/or HTTPS. As discussed, most TLS stacks for microcontrollers require many tens of kilobytes for each TLS connection. When multiple concurrent connections are required to be available on each microcontroller, the volatile memory associated with the microcontroller can become easily exhausted. The same microcontroller can host a secure client application where an external device acts as a server. Similar processing methods are applied in the microcontroller when it acts as a server or a client.

In embodiments of the present disclosure "internal" or "external" "communication endpoint" can refer to client and server which can reside on either end of the communication line. Furthermore, "internal communication endpoint task" or "internal communication endpoint" interchangeably refer to the application code residing in the microcontroller. The internal communication endpoint task can implement a server functionality, in which case it can use a transport layer security (TLS) stack to establish a secure connection which is initiated by an external communication endpoint in an outside device (e.g., external to the internal communication endpoint). In some embodiments, the TLS stack can include a piece of software that is used to validate and establish secure network connection between two computing devices. This software is responsible for both the initial connection establishment as well as exchanging encrypted messages during the lifetime of the connection.

The internal communication endpoint task can implement a client functionality in which case it can use the TLS stack to establish a secure connection which is initiated by the internal communication endpoint to an outside device (e.g., external communication endpoint). Since either communication endpoint can implement a client or a server functionality, "client" or "server" is referred to herein without mentioning if that functionality resides in a microcontroller or in an outside device. When HTTPS is user herein, it is assumed that the "internal communication endpoint task" implements a "server" functionality and the "external communication endpoint" implements a client functionality which can be a web browser.

In some embodiments, the client can be internal or external. The software that determines if the connection should be established or not (TLS Stack) can run on both the client and server independently. In some embodiments, both the client and server TLS stacks need to agree that the connection between the client and server should be established. In some embodiments, the client can be running on the device itself and it can originate a TLS handshake request to an external server.

The device can be running a server application in which case, the TLS handshake is instated by an external client device. As discussed, in order to avoid confusion with respect to which side runs client or server, they are referred to as "communication endpoints," which can represent either client or a server. Furthermore, "internal communication endpoint task" corresponds to the endpoint running inside the microcontroller. "External communication endpoint task" refers the client/or server application running inside an external device.

In some embodiments, the internal communication endpoint task can be located internally with respect to the computing device and can forward the first transport layer security request from the first external communication endpoint to the transport layer security stack. In some embodiments, the internal communication endpoint can be located internally with respect to the computing device and can initiate a request to establish the secure connection with the first external communication endpoint.

A handshake stage associated with a microcontroller can verify client and server credentials using asymmetric keys (e.g., public/private key cryptography). Upon validation of the certificates, session keys can be created with symmetric cryptography, which can be used to encrypt/validate messages that are later sent in a secure connection stage. In the secure connection stage, symmetric keys created during the handshake stage can be used to encrypt/decrypt/validate messages exchanged between the two parties. The handshake stage requires the most memory resources because at least the client needs to receive and validate the certificate of the server and validity of messages that are part of the handshake. Both parties need to use resource heavy algorithms that handle public/private key messages signing/verification. However, the end result of the handshake stage is a set of symmetric session keys that are used to encrypt/decrypt/validate application messages during the secure connection stage. Memory requirements for storing symmetric session keys is a small fraction of the storage requirement for the handshake stage. For example, the storage of the session keys can require approximately 512 bytes of memory while memory requirements for the handshake stage can be approximately 16 kilobytes.

Thus, some embodiments of the present disclosure can permit only one TLS handshake with the microcontroller at a time making it possible to reuse the handshake memory for a large number of TLS connections in series. After the completion of the handshake process, the handshake memory is no longer needed as the secure connection stage session keys have already been negotiated. In some embodiments of the present disclosure, handshake memory is used in a time division multiplexing fashion.

The present state of the art allocates memory for every TLS connection made at the same time, meaning that if a microcontroller needs to support 8 concurrent TLS connections, it would typically require allocation of 8*16 kb=128 kb of RAM. This can be a very significant portion of the total memory of a microcontroller. In most cases it could account for half or more of the memory resources of the microcontroller used for industrial applications. To solve this problem, some embodiments of the present disclosure can include a handshake manager that handles handshake requests in a round-robin fashion, handling one handshake request at a time and until each respective handshake is complete, the handshake manager does not move to the next request until completion of the prior handshake operations. This can mean that when a first TLS connection is performing a handshake, additional connections (e.g., connections 2-8) are waiting for their turn to perform a handshake with the microcontroller, thus reducing a total amount of microcontroller resources used at any one time.

In some embodiments, TLS applications can require very large buffers to parse some messages, which contain variable protocol overhead. An example of such an application is an HTTPS server which needs to process Web browser requests containing a large number of HTTP headers. Such HTTP requests can be quite large. Typical request can range in size from 2 to 4 kilobytes.

At the same time, the actual application data within the request occupies a very small fraction of the complete request. Furthermore, it is possible to negotiate with the other party of the communication channel so that future message exchanges utilize a more resource friendly protocol. This means that after the first exchange, all future exchanges could only occupy at most a few hundred bytes. However, in order to handle the protocol, the first large request still needs to be processed and handled.

In a non-secure communication channel, the stream containing HTTP headers can be read in fragments and the header data can be discarded. However, the situation can become more difficult with TLS and HTTPS since the entire message needs to be stored in buffer for decryption/validation before it gets processed. This means that the TLS application needs to reserve 2 to 4 kilobytes buffer just to be able to process the first request message and later on only approximately $\frac{1}{20}^{th}$ of that buffer will be used to handle protocol messages. Embodiments of the present disclosure can provide for more efficient use of microcontroller resources in the handling of TLS in combination with HTTPS.

Embodiments of the present disclosure can use a specialized setup of the website and webserver in order to handle the additional resource requirements associated with a TLS and HTTPS exchange. In some embodiments, the handshake memory can be used with the TLS request, as discussed above. A TLS handshake manager task can remain active after completion of the TLS handshake so that a special processing handler can be invoked by an application task (HTTPS server), allowing for an HTTP request to be received and parsed by the special code inside the associated HTTP task which uses the TLS handshake memory. The HTTP request can further include a request to share static data and a further request to switch protocols for additional handling of dynamic data, where dynamic data is desired to be exchanged. Thus, the most resource intensive part of the exchange (e.g., processing of the TLS request and HTTP request) can be performed on the handshake memory, before the connection with the client is closed. Additional TLS and/or TLS and HTTPS requests (e.g., from other clients) can then be handled in a round-robin fashion as discussed above, ensuring that the memory associated with the webserver is not exhausted due to multiple requests being received by the webserver at the same time.

FIG. 1 depicts a system 102 utilizing transport layer security (TLS), in accordance with embodiments of the present disclosure. In some embodiments, the system 102 can include a computer system that can utilize software, hardware, firmware, and/or logic to perform a number of functions described herein. The system 102 can be a combination of hardware and instructions to share information. The hardware, for example can include processing resource 124 and/or a memory resource 118/120/122 (e.g., non-transitory computer-readable medium (CRM) database, etc.). A processing resource 124, as used herein, can include a number of processors capable of executing instructions stored by the memory resource 118/120/122. Processing resource 124 can be integrated in a single device or distributed across multiple devices. The instructions (e.g., computer-readable instructions (CRI)) can include instructions stored on the memory resource 118/120/122 and executable by the processing resource 124 for performing authentication.

In some embodiments, a first handshake request 104-1 (e.g., TLS security request) can be received from a first internal communication endpoint task 106-1. In some embodiments, as depicted, the first internal communication endpoint task 106-1 can be located internally with respect to the microcontroller 110 and can forward the first transport layer security request from a first external communication endpoint 108-1 (e.g., server) to the TLS stack. As such, the TLS security request can be forwarded to the TLS stack 128 via the internal communication endpoint task 106-1.

In some embodiments, the first internal communication endpoint task 106-1 can initiate a request to establish the secure connection with the first external communication endpoint 108-1, thereby acting as a client. As further depicted in FIG. 1, an additional (e.g., second) handshake request 104-n (e.g., TLS security request) can be received from a second internal communication endpoint task 106-n. As discussed in relation to the first internal communication endpoint task 106-1, the second internal communication endpoint task 106-n can forward a TLS security request to the TLS stack 128 and/or can initiate a request to establish a secure connection with the second external communication endpoint 108-n.

In some embodiments, the first external communication endpoint 108-1 can be a Message Queuing Telemetry Transport (MQTT) broker (e.g., server) and can be in communication with internal communication endpoint task 1 via communication channels 130-1. In some embodiments, the second external communication endpoint 108-n can be a programable logic controller (PLC) client application and can be in communication with internal communication endpoint task 2 via communication channels 130-n.

In some embodiments, the microcontroller 110 can include functionality to act as a web server. For example, the microcontroller 110 can include one or more communication modules 112, which can be wireless and/or wired, that enable the microcontroller 110 to communicate with a network (e.g., the Internet). For instance, the microcontroller 110 can include a Wi-Fi communication module that can be used to communicate with one or more external communication endpoints 108-1, 108-n via a wireless connection. In view of the optional communication modules 112 included on the microcontroller 110, the microcontroller can be interchangeably referred to herein as microcontroller 110 or server 110.

As depicted in FIG. 1, in the formation of a TLS connection, the first internal communication endpoint task 106-1 can initiate a handshake request 104-1 with the TLS stack 110, which is depicted as including a handshake manager task 114, secure communication crypto op handler task 116, handshake memory 118, and session cryptography functions stack 122. In some embodiments, the handshake request 104-1 can be initiated over a network and transferred to the TLS stack 128 via the internal communication endpoint task 106-1, as discussed herein. In some embodiments, the TLS stack 128 can include a handshake manager task 114, which can be instructions stored on a memory (e.g., non-volatile memory) included on the microcontroller and can be executed by the processor 124. As further depicted in FIG. 1, the second internal communication endpoint task 106-n can also initiate a handshake request 104-n with the TLS stack 128. In some embodiments, the first handshake request 104-1 and the second handshake request 104-n can be initiated at the same time. In some embodiments, one of the handshake requests 104-1, . . . , 104-n can be initiated after beginning to authenticate the other one of the handshake requests.

In some embodiments, the order to request processing depends on the arrival time of requests if they were initiated from an external communication endpoint and/or priority of the internal communication endpoint tasks. In an example, the prioritization can be based on a timestamp and/or application priority. For instance, if two TLS requests arrive at the same time, one for a first application and another one for a second application, and the first application task has higher priority than the second application task, then an operating system of the microcontroller will schedule the first application task first, because it has a pending event (socket connection) and when the first application processes the socket connection, it will queue the message to the handshake manager task 114 task. Once that is done, the operating system of the microcontroller will schedule the second application, because it has a pending event (socket connection) and when the second application processes the socket connection, it will queue the message to the handshake manager task 114. Once that is done, the operating system will schedule the handshake manager task 114 and it will look through its queue and handle it in first in, first out fashion. Since in this particular example, there are two messages associated with the first application and second application, the message from the first application will be handled first, because it was queued first.

Upon receipt of the first handshake request 104-1, the handshake request can be received by a handshake manager task 114. In some embodiments, the handshake manager task 114 can prioritize memory resources with respect to performance of the first series of authentication steps associated with the first handshake request 104-1, as further discussed herein, until the first series of authentication steps have been completed. The handshake manager task 114 can schedule authentication actions associated with each handshake request 104. For instance, as depicted, in FIG. 1 the first handshake request 104-1 can be received at a same time as the second handshake request 104-2. As a result, the handshake manager 114 can hold the second handshake request 104-n in a queue until processing associated with the authentication steps for the first handshake request 104-1 are complete. As a result of holding the second handshake request 104-n in a queue until the processing associated with the first handshake request 104-1 is complete, the handshake memory 118 resources can be preserved, preventing over-utilization of the handshake memory 118 resources of the microcontroller, on what can already be a resource constrained device.

In some embodiments, a first series of authentication steps, as further discussed herein, can be performed with the microcontroller 110, related to the first transport layer security request. In some embodiments, the handshake manager task 114 and the secure communication crypto op handler task 116 can be instructions stored in a non-volatile memory of the microcontroller 110 and can be executed by the processor 124, performing the authentication steps (e.g., authentication operations). Operations associated with processing the handshake request 104-1 can be performed on the handshake memory 118. For example, the first series of authentication steps with the TLS stack 128 can be performed using the handshake memory 118 associated with the TLS stack 128 to perform the first series of authentication steps. In some embodiments, all of the handshake memory 118 can be dedicated to performing the first series of authentication steps.

As depicted in FIG. 1, the handshake manager task 114 is used to exchange all the TLS handshake messages related to the current connection, establish asymmetric keys (public/private keys), validate certificates against root of trust as well as validate connection messages and create session keys used during the secure communication stage. The secure communication crypto op handler task 116 can perform cryptographic operations (e.g., authentication steps) associated with the TLS request to provide secure communications between the internal communication endpoints 106-1, 106-n and the external communication endpoints 108-1, 108-n. For example, the secure communication crypto op handler 116 can use asymmetric keys, established during the handshake, to encrypt and/or decrypt application messages exchanged during the secure connection stage.

In response to completion of the first series of authentication steps with the handshake manager task 114, a determination can be made of whether to establish a secure connection between the internal communication endpoints 106-1, 106-*n* and a respective one of the external communication endpoints 108-1, 108-*n*. As depicted, the handshake manager task 114 can communicate with the secure communication crypto op handler task 116 in performing the authentication steps associated with the handshake requests 104-1, 104-*n*. In some embodiments, in response to completing the first series of authentication steps, a determination can be made with the TLS stack 128 that credentials of the external communication endpoint 108-1, . . . , 108-*n* are trusted and a secure connection can be made.

Pending a determination that a secure connection can be made, session keys can be created by the TLS stack 128 (e.g., the handshake manager task 114). Thus, the communication between the first internal communication endpoint 106-1 and the first external communication endpoint 108-1, for example, can enter a secure connection stage, which utilizes a first session memory 120-1 of the internal communication endpoint task 106-1 and the session cryptography functions stack 122 and no longer utilizes the handshake memory 118. In the secure connection stage, communication can occur between the internal communication endpoints 106-1, . . . , 106-*n* and the external communication endpoints 108-1, . . . , 108-*n* via decrypt/encrypt application messages 126-1, using the session keys generated in the performance of the authentication steps.

As mentioned, the amount of memory needed for subsequent communications, post authentication steps, can be much less than the memory needed for performing the authentication steps. Accordingly, the session memory 120 and the session cryptography functions stack 122 can be used for subsequent communications, in parallel, between all authenticated communication endpoints. For example, as depicted, upon authentication of the first external communication endpoint 108-1 and/or second external communication endpoint 108-*n*, the external communication endpoints 108-1, 108-*n* can communicate with the internal communication endpoints 106-1, 106-*n* via decrypt/encrypt application message 126-1, 126-*n*. In response to decryption/encryption of an application message, data can be processed 132-1, 132-*n*.

In some embodiments, as discussed herein, the handshake memory 118 can be memory that is used for authentication steps that are performed during a handshake stage. The handshake memory can include memory that stores public and/or private keys, memory that stores Public Key Infrastructure (PKI) algorithms, and/or memory that stores certificates and/or parts of certificates that can be needed for authentication.

Completion of the first series of authentication steps can result in a determination that the credentials of the first external communication endpoint 108-1 can be trusted and/or untrusted, depending on the operations completed by the handshake manager task 114. In some embodiments, in response to completion of the first series of authentication steps, the handshake memory 118 can be released and no longer used and the handshake manager task 114 can schedule authentication actions to be completed for the second handshake request 104-*n* on the handshake memory. In an example, the second series of authentication steps with the second internal communication endpoint task 106-*n* related to the second transport layer security request initiated with the second external communication endpoint 108-*n* can include performing the second series of authentication steps in response to formation of the secure connection between the first external communication endpoint 108-1 and the internal communication endpoint 106-1, as a result of determining that the credentials of the first external communication endpoint 106-1 are trusted.

In a further example, the second series of authentication steps with the second internal communication endpoint 106-*n* related to the second transport layer security request can include performing the second series of authentication steps in response to termination of any prospective connection between the first external communication endpoint 106-1 and the internal communication endpoint 106-1, as a result of determining that the credentials of the first external communication endpoint 108-1 are untrusted. Either way, upon a determination that the credentials of the first external communication endpoint 106-1 are trusted or untrusted, the handshake memory 118 used in the determination can be released and no longer used, as the authentication steps associated with the handshake request 104-1 can be completed, resulting in determination of a trusted or untrusted connection and handshake complete 134-1, 134-*n*. As such, operations associated with only one handshake request 104-1 can be performed using the handshake memory 118 at any one time to prevent the handshake memory 118 from being overutilized.

In some embodiments, in response to completion of the first series of authentication steps, a second series of authentication steps related to the second transport layer security request can be performed with the TLS stack 128. In a similar or same manner to that discussed above in relation to the first external communication endpoint 106-1 and the first transport layer security request, a second series of authentication steps can be performed with the TLS stack 128, related to the second transport layer security request. For example, the second transport layer security request can be held in a queue, until the determination whether to establish the secure connection between the first external communication endpoint 108-1 and the first internal communication endpoint 106-1, in response to completion of the first series of authentication steps is made. Upon completion of the determination, all of the handshake memory 118 can be made available to processing the second transport layer security request.

As discussed, operations associated with processing the second handshake request 104-*n* can be performed on the handshake memory 118. For example, the second series of authentication steps with the second internal communication endpoint 106-*n* can be performed using the handshake memory 118 associated with the server 110. In some embodiments, all of the handshake memory can be dedicated to performing the second series of authentication steps, in response to completion of the first series of authentication steps.

As depicted in FIG. 1, the handshake manager task 114 can perform cryptographic operations associated with the second TLS request (e.g., handshake request 104-*n*) to provide secure communications between the second external communication endpoint 108-*n* and the second internal communication endpoint 106-*n*. Although the internal communication endpoint 106-*n* is referred to as second internal communication endpoint 106-*n*, there can be any number of internal communication endpoints "n" attempting to perform handshake requests with the TLS stack 128. The handshake manager task 114 can use an asymmetric key (e.g., public/private key cryptography) to validate a certificate against a root of trust. The handshake manager task can further create session keys (e.g., symmetric cryptography) that are used to encrypt/validate messages in a "secure connection" stage, which happens after the handshake request 104-*n* has been processed.

In response to completion of the second series of authentication steps with the handshake manager task 114, a determination can be made of whether to establish a secure connection between the second external communication endpoint 108-*n* and the second internal communication endpoint 106-*n* in response to completion of the second series of authentication steps. In some embodiments, in response to completing the second series of authentication steps, a determination can be made with the TLS stack 128 that credentials of the second external communication endpoint 108-*n* are trusted and a secure connection can be made. Pending a determination that a secure connection can be made, session keys can be created by the second external communication endpoint 108-*n* and the TLS stack 128 (e.g., handshake manager task 114). Thus, the communication between the second external communication endpoint client 108-*n* and the internal communication endpoint can enter a secure connection stage, which utilizes session memory 120 and no longer utilizes the handshake memory 118.

For example, completion of the second series of authentication steps can result in a determination that the credentials of the second external communication endpoint 108-*n* are trusted and/or untrusted, depending on the operations completed by the handshake manager task 114. In some embodiments, in response to completion of the second series of authentication steps, the handshake memory 118 can be released and no longer used for the second series of authentication steps and the handshake manager task 114 can schedule authentication actions to be completed for a next handshake request that is received, on the handshake memory 118. In an example, a next series of authentication steps with the internal communication endpoint related to the next transport layer security request includes performing the next series of authentication steps in response to formation of the secure connection between the second external communication endpoint 108-*n* and the second internal communication endpoint 106-*n* as a result of determining that the credentials of the second external communication endpoint 108-*n* are trusted.

In a further example, the next series of authentication steps with the internal communication endpoint related to the next transport layer security request includes performing the next series of authentication steps in response to termination of any prospective connection between the second external communication endpoint 108-*n* and the second internal communication endpoint 106-*n* as a result of determining that the credentials of the second external communication endpoint 108-*n* are untrusted. Either way, upon a determination that the credentials of the second external communication endpoint 108-*n* are trusted or untrusted, the handshake memory 118 used in the determination can be released and no longer used for the determination specific to the second internal communication endpoint 106-*n*. As such, operations associated with only one handshake request 104-1, 104-*n* can be performed using the handshake memory 118 at any one time to prevent the handshake memory 118 from being overutilized.

Although two external communication endpoints are depicted in FIG. 1, including first external communication endpoint and n (e.g., second) external communication endpoint, any number "n" of external communication endpoints 108 can be present. For example, ten or more external communication endpoints can be present in some instances and can be dependent on how many external communication endpoints are trying make an initial communication with the internal communication endpoint 106. For example, in some embodiments, ten or more external communication endpoints may simultaneously try to communicate with the internal communication endpoints 106 and thus the handshake manager task 114 may put all but one of the associated authentication requests in a queue. For example, the handshake manager task 114 may only allow one of the transport layer security requests to be processed at any one time, while holding the remaining transport layer security requests in queue. As discussed, the remaining transport layer security requests can be held in queue until the first transport layer security request is processed and then each consecutive transport layer security request is processed.

In some embodiments, more than one of the transport layer security requests can be processed at any one time. For example, in some embodiments, where a plurality of transport layer security requests (e.g., 10 transport layer security requests are received), a number of transport layer security requests that is greater than one, but is less than the overall number of transport layer security requests, can be processed at any one time. In an example, multiple ones of the transport layer security requests can be processed at any one time, while a remaining number of the transport layer security requests are held in a queue. For instance, two transport layer security requests can be processed at any one time, while the remaining 8 transport layer security requests are held in queue until one or both of the two initial transport layer security requests are processed. Thus, some embodiments can allow for multiple ones of the transport layer security requests to be processed (e.g., 2, 3, etc.) at any one time, thereby balancing the use of handshake memory resources used by the server 110 with initial wait times for processing of the transport layer security requests.

In some embodiments, an order for associated processing of the transport layer security requests can be dependent on a time stamp for when each of the transport layer security requests was received. In some embodiments, additionally or in the alternative, the order for associated processing of the transport layer security request can be dependent on a priority of the application task that is supposed to handle the payload data after the connection is established In some embodiments, the order for associated processing of the transport layer security requests can be based on an internal communication endpoint task priority associated with each transport layer security request. In some embodiments, the order for processing of the transport layer security requests can initially be based on a time stamp for when each of the transport layer security requests was received. If a time stamp for one or more of the transport layer security requests is the same as or similar to another one of the received transport layer security requests, then the transport layer security requests with the same or similar time stamp can be prioritized in terms of processing, based on an internal communication endpoint task priority associated with each transport layer security request.

In some embodiments, a priority can be based on a service the task is supposed to handle. For example if 2 servers running in the device (e.g. HTTPS and Secure Fieldbus), it is assumed that Secure Fieldbus has higher priority compared to HTTPS and therefore the task that services SecFieldbus will have a higher priority than the HTTPS task. Therefore if two requests arrive at the same time (e.g., one for SecFieldbus connection and another one for HTTPS connection, the application task for SecFieldbus will be invoked first (due to its priority) and it will queue the connection request to the handshake manager task 114 first.

Figure 2:
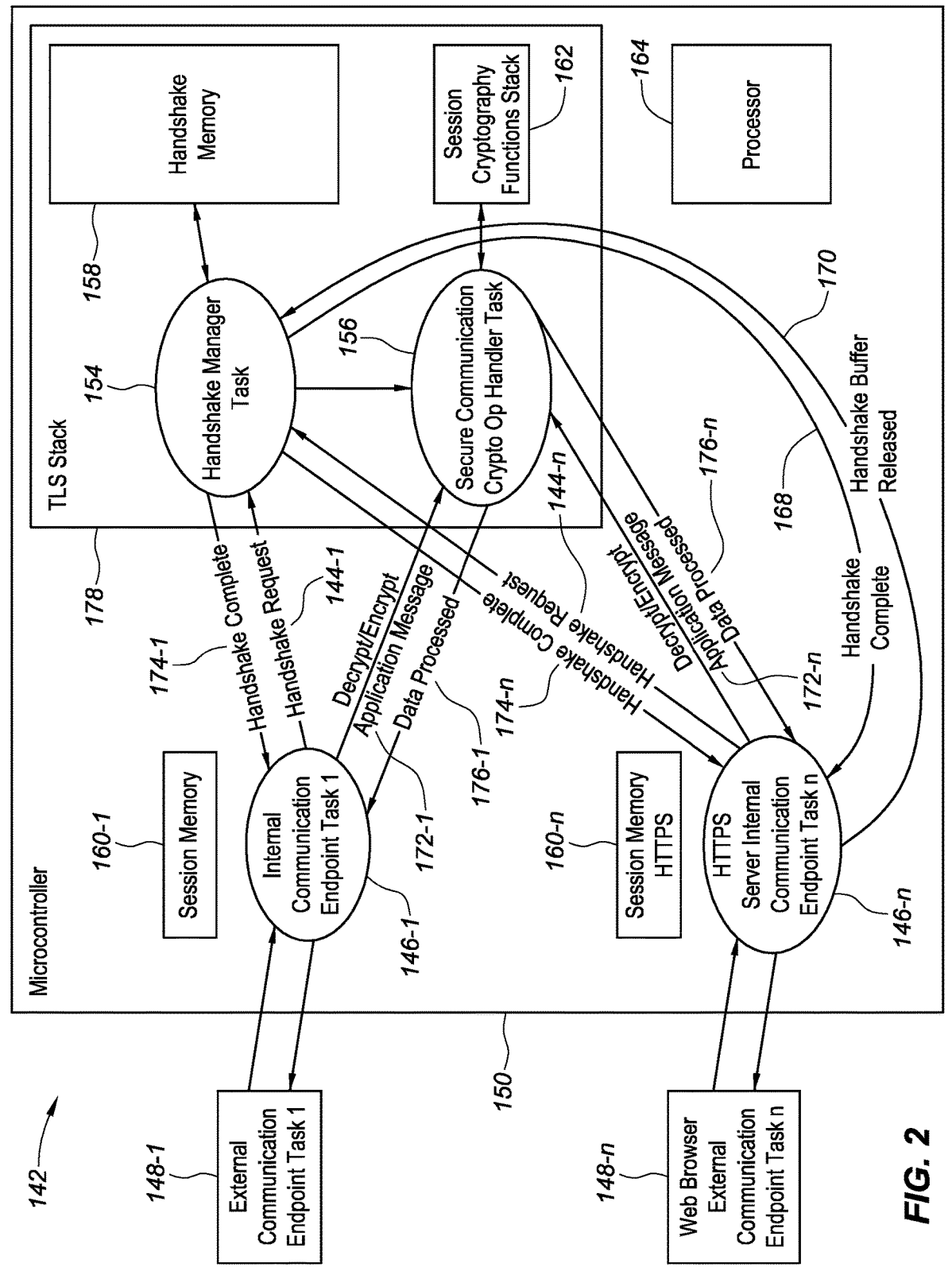
FIG. 2 depicts a system utilizing TLS and hypertext transport protocol secure (HTTPS), in accordance with embodiments of the present disclosure.

FIG. 2 depicts a system 142 utilizing TLS and hypertext transport protocol secure (HTTPS), in accordance with embodiments of the present disclosure. Embodiments depicted in FIG. 2 can include some of the same or similar features as those depicted and discussed in relation to FIG. 1. In some embodiments, a first handshake request (e.g., TLS security request) 144-1 can be received from a first internal communication endpoint task 146-1. As further depicted in FIG. 1, an additional (e.g., second) handshake request 144-n can be received from a second internal communication endpoint task 146-n. In some embodiments, the second internal communication endpoint task 146-n can be representative of an HTTPS server, as depicted. Accordingly, the second handshake request 144-n can be associated with a HTTPS request, and in some embodiments can be initiated by an external communication endpoint task 148-2, which can be representative of a web browser, for example. Although both a first internal communication endpoint task 146-1 and a second HTTPS server internal communication endpoint task 146-n are depicted in FIG. 2, each of the internal communication endpoint tasks 146-1, 146-n can include an application task, each of the internal communication endpoint tasks 146-1, 146-n can include HTTPS requests, or each of the internal communication endpoint tasks 146-1, 146-n can include a mix of application tasks and HTTPS server request handlers, as depicted.

As depicted in FIG. 2, the secure communication crypto op handler task 156 can perform cryptographic operations associated with the first handshake request 144-1 to provide secure communications between the first external communication endpoint task 148-1 and the microcontroller 150, allowing for communication between the two via decrypt/encrypt application message 172-1, 172-n. The secure communication crypto op handler task 156 can further use session keys (e.g., symmetric cryptography) that are used to encrypt/validate messages in a "secure connection" stage, which happens after the handshake request 144-1 has been processed and utilizes a session memory 160 and the session cryptography functions stack 162 and no longer utilizes the handshake memory 158.

In response to completion of the first series of authentication steps with the handshake manager task 154, which can be instructions stored on a memory of the microcontroller 150 and executable by the processor 164, a determination can be made of whether to establish a secure connection between the internal communication endpoints 146-1, 146-n and a respective one of the external communication endpoints 148-1, 148-n. In some embodiments, in response to completing the first series of authentication steps, a determination can be made with a TLS stack 178 that credentials of the first external communication endpoint 148-1 are trusted and a secure connection can be made. Pending a determination that a secure connection can be made, session keys can be created by the TLS stack 178 (e.g., the handshake manager task 154). Thus, the communication between the first internal communication endpoint task 146-1 and the first external communication endpoint 148-1, for example, can enter a secure connection stage, which utilizes a first session memory 160-1 of the first internal communication endpoint task 146-1 and no longer utilizes the handshake memory 158.

In some embodiments, a determination can be made that the credentials of the first external communication endpoint task 148-1 are untrusted, as discussed herein. Either way, upon a determination that the credentials of the first external communication endpoint task 148-1 are trusted or untrusted, the handshake memory 158 used in the determination can be released and no longer used, as the authentication steps associated with the handshake request 144-1 can be completed, resulting in determination of a trusted or untrusted connection and handshake complete. As such, operations associated with only one handshake request 144-1 can be performed using the handshake memory 158 at any one time to prevent the handshake memory 158 from being overutilized.

As depicted, the second internal communication endpoint task n 146-n can include an HTTPS request. In establishing communication between the second internal communication endpoint task 146-n and the microcontroller 150, authentication actions can be performed, as discussed herein. For example, the secure communication crypto op handler task 156 can perform cryptographic operations associated with the second TLS request 144-n to provide secure communications between the internal communication endpoints 146-1, 146-n and the external communication endpoints 148-1, 148-n. For example, the secure communication crypto op handler task 156 can use a symmetric keys, established during the handshake, to encrypt and/or decrypt application messages exchanged during the secure connection stage. In response to decryption/encryption of an application message, data can be processed 176-1, 176-n.

In response to completion of the second series of authentication steps with the handshake manager task 154, a determination can be made of whether to establish a secure connection between the second external communication endpoint task 148-n and the HTTPS server internal communication endpoint task 146-n, in response to completion of the second series of authentication steps. In some embodiments, in response to completing the second series of authentication steps, a determination can be made with the TLS stack 178 (e.g., handshake manager task 154) that credentials of the second external communication endpoint task 148-n are trusted and a secure connection can be made.

Since the handshake memory 158 is used to process the authentication steps associated with the second handshake request 144-n, the handshake manager task 154 can continue to provide access to the handshake memory 158 so it can be used in processing the HTTPS request. In some embodiments, an HTTP request can be received from the second external communication endpoint task 148-n, upon performing the second series of authentication steps associated with the second external communication endpoint task 148-n. In an example, the HTTP request can include a request to share static data with the second external communication endpoint task, which can include HTML files, JavaScript, graphics (e.g., .jpeg files, etc.). Because the handshake memory 158 is still made available by the handshake manager task 154, the HTTP request can be parsed with the handshake memory 158 of the TLS stack 178 and static data can be provided to the second external communication endpoint 148-n. In some embodiments, the handshake memory 158 can be released upon parsing the HTTP request and providing the static data to the second external communication endpoint 146-n, or dynamic data as further discussed herein.

In some embodiments, two types of HTTPS connections can be associated with embodiments of the present disclosure. A first type of HTTPS connection can involve the exchange of static data. For example, an HTTP request can request static files, where a client establishes a TLS connection and the client sends a request for static files. A server can parse the request for static files and send back the desired file, which can be encrypted using session keys. Upon completing the request, the server can close the connection with the client. In this example, an associated handshake memory can handle establishing the TLS connection, sending the request for static files, and parsing the request. A second type of HTTPS connection can involve the exchange of dynamic data. For example, a client can establish a TLS connection and the client can send a request to upgrade the connection to a WebSocket connection. In response, the server can parse the request and send back a response that the connection has been upgraded to WebSockets (e.g., encrypted using session keys). The client can then send a first WebSocket request, which can be encrypted using session keys. In response, the server can send a first WebSocket response (e.g., encrypted using session keys). In response, the client can close the connection or keep the connection active to perform multiple WebSocket exchanges. In the example using dynamic data, the handshake memory can handle establishing the TLS connection, sending a request to upgrade the connection to a WebSocket connection, and parsing the request, since the client request could be large.

In some embodiments, an HTTP request can be received by the second internal communication endpoint task 146-$n$ from the second external communication endpoint task 148-$n$, upon performing the first series of authentication steps. The HTTP request can include a request to share dynamic data with the second external communication endpoint task 148-$n$ and a request to switch protocols for additional handling of dynamic data. In an example, a protocol that can be used for the transfer of dynamic data can be WebSockets. In some embodiments, dynamic data can include input/output data, configuration data, and/or network settings (e.g., IP addresses, Profinet device name), and can be provided to the second external communication endpoint task 148-$n$ using a session memory 160-$n$ of the microcontroller 150. In some embodiments, by using the session memory 160-$n$ of the microcontroller 150, for the transfer of dynamic data, the handshake memory 158 can thus remain open and not used. In some embodiments, the dynamic data does not require much in terms of memory requirements for associated transfers and can be fragmented, if necessary. By using the session memory 160-$n$ for the transfer of dynamic data, the handshake memory 158 can be used for the performance of further authentication steps associated with other clients.

As depicted in FIG. 2, in the performance of the above steps, the handshake manager task 154 can dedicate the handshake memory 158 to completion of the authentication steps. After performance of the authentication steps, rather than releasing the handshake memory 158 for use in authentication steps associated with another external communication endpoint task, the handshake manager task 154 can dedicate the handshake memory 158 for use in relation to processing the HTTPS request, as indicated by communication 168. The handshake memory 158 can then be used in processing the HTTPS request, as indicated by the line 170. For example, upon receiving the HTTP request from the second external communication endpoint task 148-$n$, the HTTP request can be parsed with the handshake memory 158 of the server. As depicted, the second external communication endpoint task 148-$n$ can be associated with a web browser, in some embodiments. In the HTTPS exchange, the request that contains the most overhead can be the HTTP client request that is sent right after the authentication steps are completed.

In some embodiments, the HTTP request can be sent from the second external communication endpoint task 148-$n$ to the second internal communication endpoint task 146-$n$ during completion of the authentication steps and/or when the initial handshake request 144-$n$ is sent and the HTTP request can be held in queue by the handshake manager task 154. Upon processing of the HTTP request with the handshake memory 158, the additional exchanges that later occur (e.g., exchange of dynamic data) can utilize very small amounts of memory (e.g., session memory 160). In some embodiments, the handshake manager task 154 does not release handshake memory resources right after the completion of the authentication steps associated with the handshake request 144-1 (e.g., handshake complete 174-1, 174-$n$), but in some embodiments, can pass the handshake memory buffer to a specific application allowing it to use the handshake buffer to complete the first exchange which requires a greater amount of memory resources. In some embodiments, that application can notify the handshake manager task 154 that it does not need the handshake buffer any longer and it can be reused by other applications to perform authentication steps (e.g., transport layer security handshake). For example, as represented by communication 170, the second internal communication endpoint task 146-$n$ can notify the handshake manager task 154 that the handshake buffer associated with the handshake memory 158 is no longer needed for parsing of the HTTP request and the handshake memory 158 can be released for use in additional authentication steps associated with additional clients.

Figure 3:
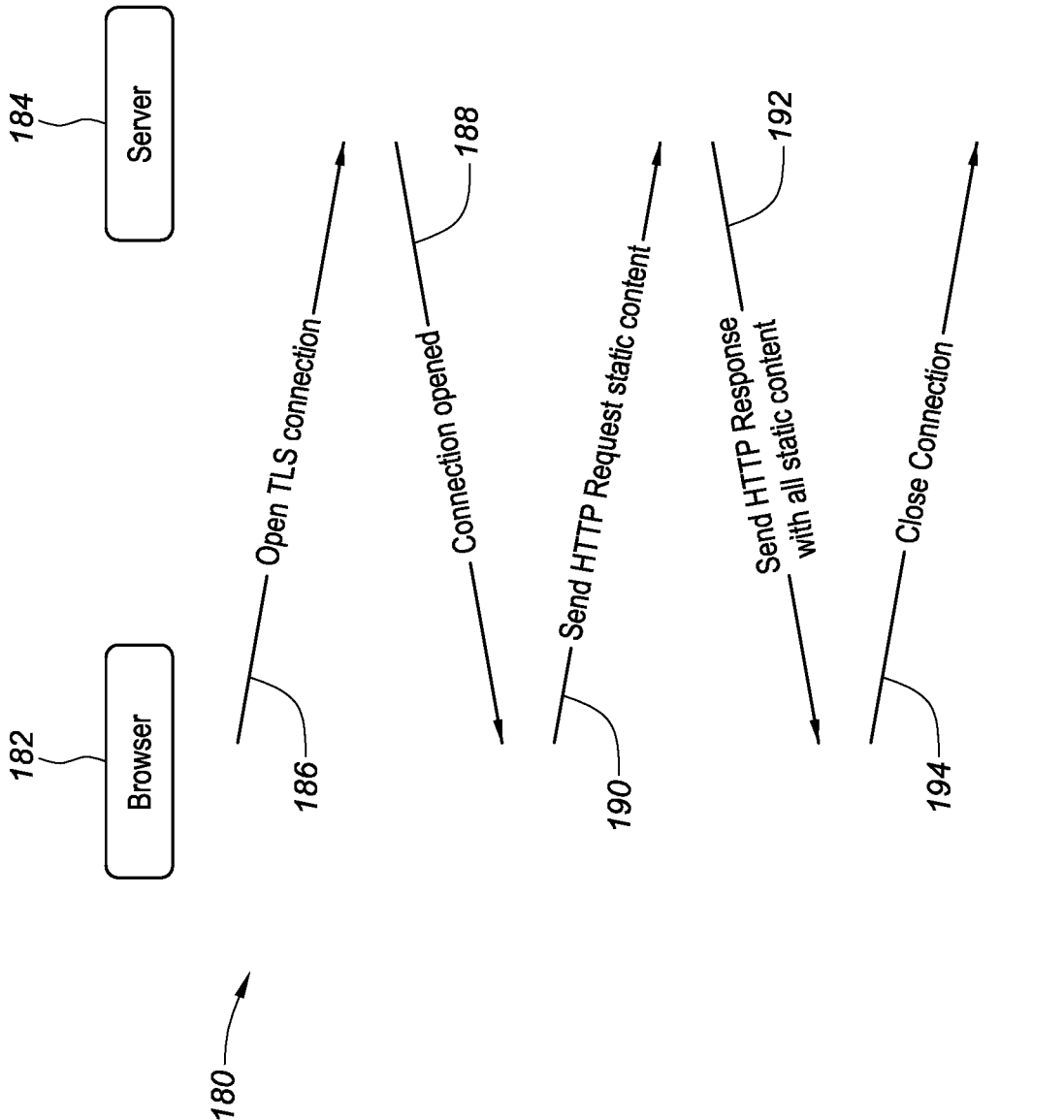
FIG. 3 depicts a flow diagram of an exchange of static content between a browser and an HTTPS server utilizing TLS and HTTPS, in accordance with embodiments of the present disclosure.

FIG. 3 depicts a flow diagram 180 of an exchange of static content between a browser 182 and a microcontroller server 184 utilizing TLS and HTTPS, in accordance with embodiments of the present disclosure. In some embodiments, the browser 182 can initiate a request to open a TLS connection with the server 184, in the form of a handshake request, as discussed herein, and represented by open TLS connection flow 186. As discussed herein, the browser 182 can be associated with a client computer that is desiring to interact with the server 184, which in some embodiments can be a microcontroller, as discussed herein, which includes a communication module that can provide for wireless communication via a wireless network protocol (e.g., Wi-Fi). In response to the handshake request, the server can allocate handshake memory via a handshake manager task, which can allocate all of a handshake memory associated with the server to processing the TLS request sent by the browser 182. In some embodiments, authentication operations can be performed on the handshake memory and in response to completion of the authentication operations and authentication of the credentials of the browser 182 and the server 184, a connection can be opened, as represented by connection opened flow 188.

In some embodiments, the handshake manager task does not release handshake memory resources right after the connection has been opened, but in some embodiments, can pass the handshake memory buffer to a specific application allowing it to use the handshake buffer to complete the first exchange which requires a greater amount of memory resources than subsequent communications made between the server 184 and browser 182. In some embodiments, the first exchange can include a single HTTP message sent by the browser 182 to the server 184, which can include a request to send static content from the server 184 to the browser 182, as represented by send HTTP request static content flow 190. In some embodiments, the handshake manager 154, as discussed in FIG. 2, can allow for the handshake memory 158 to parse the HTTP message and provide the static content to the browser 148-$n$ from the HTTPS server 146-$n$. In response to the static content being sent to the browser, represented by send HTTP response with all static content flow 192, the connection between browser 182 and the server 184 can be closed, which can be represented by close connection flow 194. Subsequent communications between the browser 182 and the server 184 can be exchanged with smaller amounts of overhead (e.g., use of memory) than the initial amount of overhead associated with establishing the connection and processing the first HTTP request.

Figure 4:
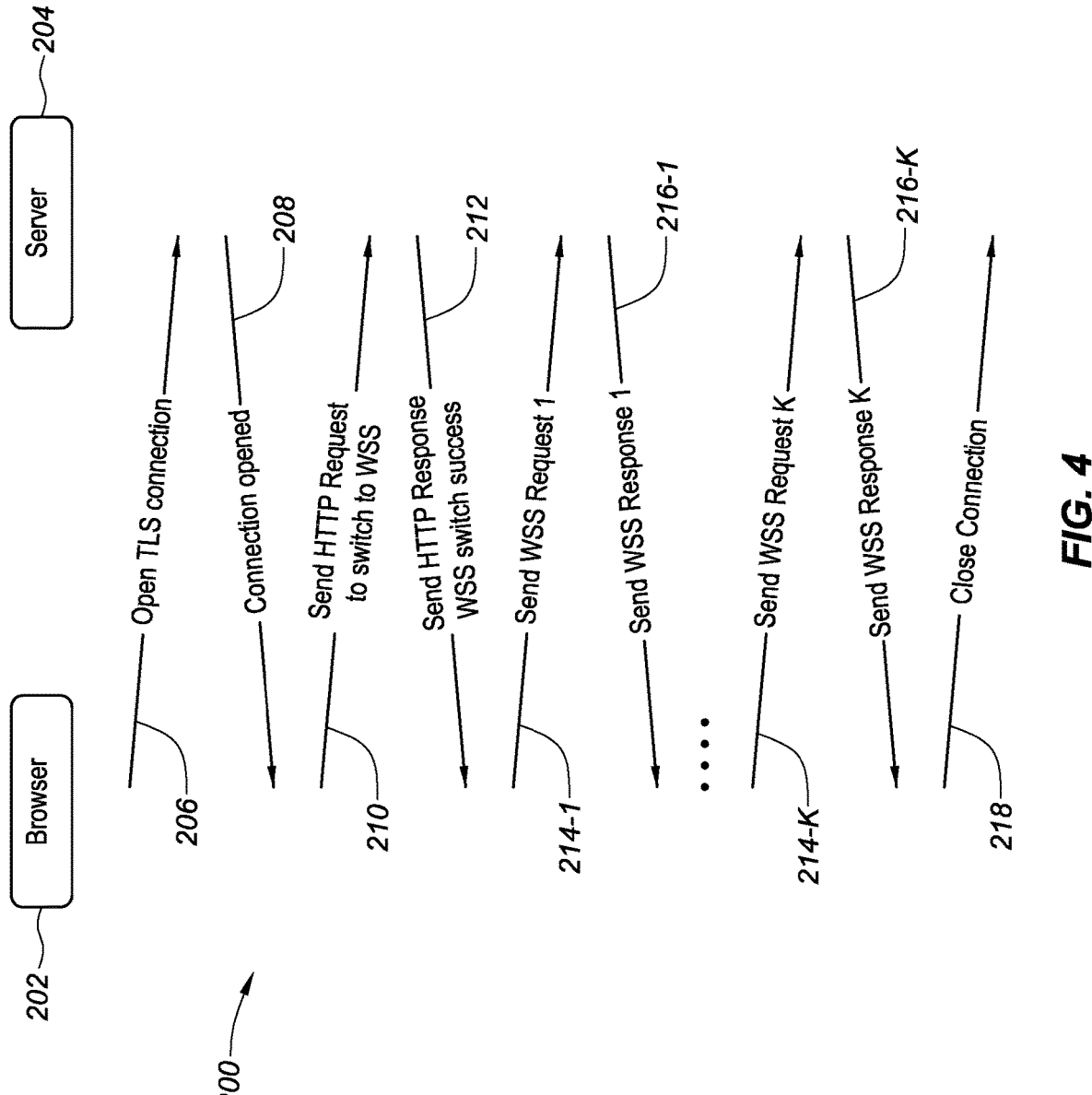
FIG. 4 depicts a flow diagram of an exchange of dynamic content between a browser and an HTTPS server utilizing TLS and HTTPS, in accordance with embodiments of the present disclosure.

FIG. 4 depicts a flow diagram 200 of an exchange of dynamic content between a browser 202 and an HTTPS server 204 utilizing TLS and HTTPS, in accordance with embodiments of the present disclosure. In some embodiments, the browser 202 can initiate a request to open a TLS connection with the server 204, in the form of a handshake request, as discussed herein, and represented by open TLS connection flow 206. As discussed herein, the browser 202 can be associated with a client computer that is desiring to interact with the server 204, which in some embodiments can be a microcontroller, as discussed herein, which includes a communication module that can provide for wireless communication via a wireless network protocol (e.g., Wi-Fi). In response to the handshake request, the server 204 can allocate handshake memory via a handshake manager task, which can allocate all of a handshake memory associated with the server to processing the TLS request sent by the browser 202. In some embodiments, authentication operations can be performed on the handshake memory and in response to completion of the authentication operations and authentication of the credentials of the browser 202 and the server 204, a connection can be opened, as represented by connection opened flow 208.

In some embodiments, the handshake manager task does not release handshake memory resources right after the connection has been opened, but in some embodiments, can pass the handshake memory buffer to a specific application allowing it to use the handshake buffer to complete the first exchange which requires a greater amount of memory resources than subsequent communications made between the server 204 and browser 202. In some embodiments, the first exchange can include a single HTTP message sent by the browser 202 to the server 204, which can include a request to send dynamic content from the server 204 to the browser 202 and a request to switch to a more resource friendly protocol, as represented by send HTTP request to switch to WebSockets (WSS) 210. In an example, the request to switch protocols can be a request to switch protocols for additional handling of dynamic data. In some embodiments the request to switch protocols can include a request to switch to a WebSockets protocol for additional handling of dynamic data. The WebSockets protocol can have a small message format with no additional variable length overhead imposed by browsers. Upon switching protocols, the server 204 can send a confirmation, represented by send HTTP response WSS switch success flow 212. For example, in some embodiments, when the server 204 successfully switches to the WebSockets protocol, the server 204 can send a response that it has successfully switched to WebSockets, represented by flow 212.

Each HTTP message exchange involves a large amount of overhead and most cases when dynamic data is exchanged, the usable data occupies a very small fraction of a number of bytes exchanged. Due to the inability of the server 204 to force the client to fragment the TLS messages, all this additional protocol data can be bundled into a single TLS frame requiring the server to allocate data (e.g., 4 KB) in the HTTPS server application task. This can make it possible for the client associated with the browser 202 to control fragmentation of TLS frames as all the WebSocket frames are sent in separate TLS records.

In some embodiments, as depicted in FIG. 4, a series of WebSocket requests 214-1, . . . , 214-K for dynamic data can be sent by the browser 202 to the server 204. As further depicted, in response to the WebSocket requests 214-1, . . . , 214-K, responses can be provided to the browser, represented by send WSS Response flow 216-1, . . . , 216-K. In some embodiments, the client associated with the browser can control a connection duration between the browser 202 and the server 204, by opening the WebSocket connection and performing the needed number of exchanges. In response to the browser 202 obtaining a requisite amount of dynamic data, the browser 202 can send a request to the server 204 to close the connection between the browser 202 and the server 204. The handshake manager task can release a handshake memory right after sending the response 212 to allow other TLS connections to be established concurrently with the exchange of dynamic data in 214-1/216-1 . . . 214-K/216-K. As represented by the embodiments depicted in FIGS. 3 and 4, in some embodiments, the only HTTP request message that needs to be handled by the server 184, 204 can be for one of two reasons: a request to provide static content, as depicted and discussed in relation to FIG. 3, and/or a request to switch protocols (e.g., to WebSockets), as depicted and discussed in relation to FIG. 4.

In some embodiments, the initial message exchange after handshake can be large on some other protocols and therefore the same approach can be used, as with WebSockets. Accordingly, embodiments of the present disclosure include a mechanism where an application tells the handshake manager that it needs to service the first set of exchanges after the handshake and the handshake manager does not release the handshake memory and does not start with the next handshake until the current application notifies it to do so (e.g., when it is done with the initial set of large exchanges).

FIG. 5 depicts a method 230 flow diagram for performing authentication, in accordance with embodiments of the present disclosure. As previously discussed, the method 230 can include receiving 232, with a transport layer security stack, a plurality of transport layer security requests from a plurality of internal communication endpoint tasks, wherein the plurality of transport layer security requests are related to establishing a secure connection with a plurality of respective external communication endpoints. In some embodiments, the internal communication endpoint task can be included on a microcontroller that includes a communication module, which can enable the microcontroller to communicate with a plurality of clients, thereby acting as a server.

Oftentimes, a microcontroller can have limited memory, which can be exhausted when attempting to form secure connections with multiple ones of the plurality of external communication endpoints. Accordingly, embodiments of the present disclosure can enable the limited memory resources of the microcontroller to be managed in a way that prevents them from being overutilized. In some embodiments, the method 230 can include performing 234 a first series of authentication steps related to a first one of the plurality of transport layer security requests received from a first one of the plurality of internal communication endpoint tasks, utilizing a handshake memory of the transport layer security stack. In some embodiments, the transport layer security stack can include a handshake manager task and a handshake memory. The handshake manager task can be executed in order to create a queue when multiple handshake requests are received at any one time from multiple internal communication endpoint tasks.

In some embodiments, the method 230 can include determining 236 whether to establish a secure connection with a first one of the plurality of external communication endpoints in response to completion of the first series of authentication steps. The decision of whether to establish a secure connection with the first external communication endpoint can be based on a handshake stage where the external communication endpoint and respective internal communication endpoint verify each other's credentials using symmetric keys (e.g., public/private key cryptography). Certificates associated with the internal communication endpoint and the external communication endpoint are validated against a root of trust. Upon validation of the certificates, session keys can be created utilizing symmetric cryptography, which can be used to encrypt/validate messages in a secure connection stage.

In some embodiments, the method 230 can include receiving 238 an HTTP request with the transport layer security stack, from the first one of the plurality of external communication endpoints, in response to establishment of the secure connection, along with a request to provide static data to the first one of the plurality of external communication endpoints. Alternatively, and/or in addition, in some embodiments, the transport layer security stack can receive an HTTP request from the first external communication endpoint, along with a request to provide dynamic data to the first external communication endpoint, as discussed herein.

In some embodiments, the method can include parsing 240 the HTTP request with the handshake memory of the transport layer security stack and providing the static data to the first external communication endpoint. In some embodiments, since the handshake memory is used in the establishment of the connection between the first external communication endpoint and the first internal communication endpoint, the handshake memory can continue to be used in the parsing of the HTTP request and providing of the static data to the external communication endpoint, which can involve memory intensive steps. In some embodiments, all of the handshake memory can be used in establishing the secure connection, parsing the HTTP request, and providing the static data to the first external communication endpoint.

In some embodiments, the method 230 can include performing 242 a second series of authentication steps with the transaction layer security stack related to a second one of the plurality of transport layer security requests utilizing the handshake memory of the transport layer security stack, in response to the static data being provided to the first external communication endpoint. In some embodiments, the method can further include receiving a message from the first external communication endpoint to close the secure connection between the internal communication endpoint and the first external communication endpoint. Upon closing of the connection between the internal communication endpoint and the first external communication endpoint, the handshake memory of the transport layer security stack can be released and can be used for performing the second series of authentication steps.

Figure 6:
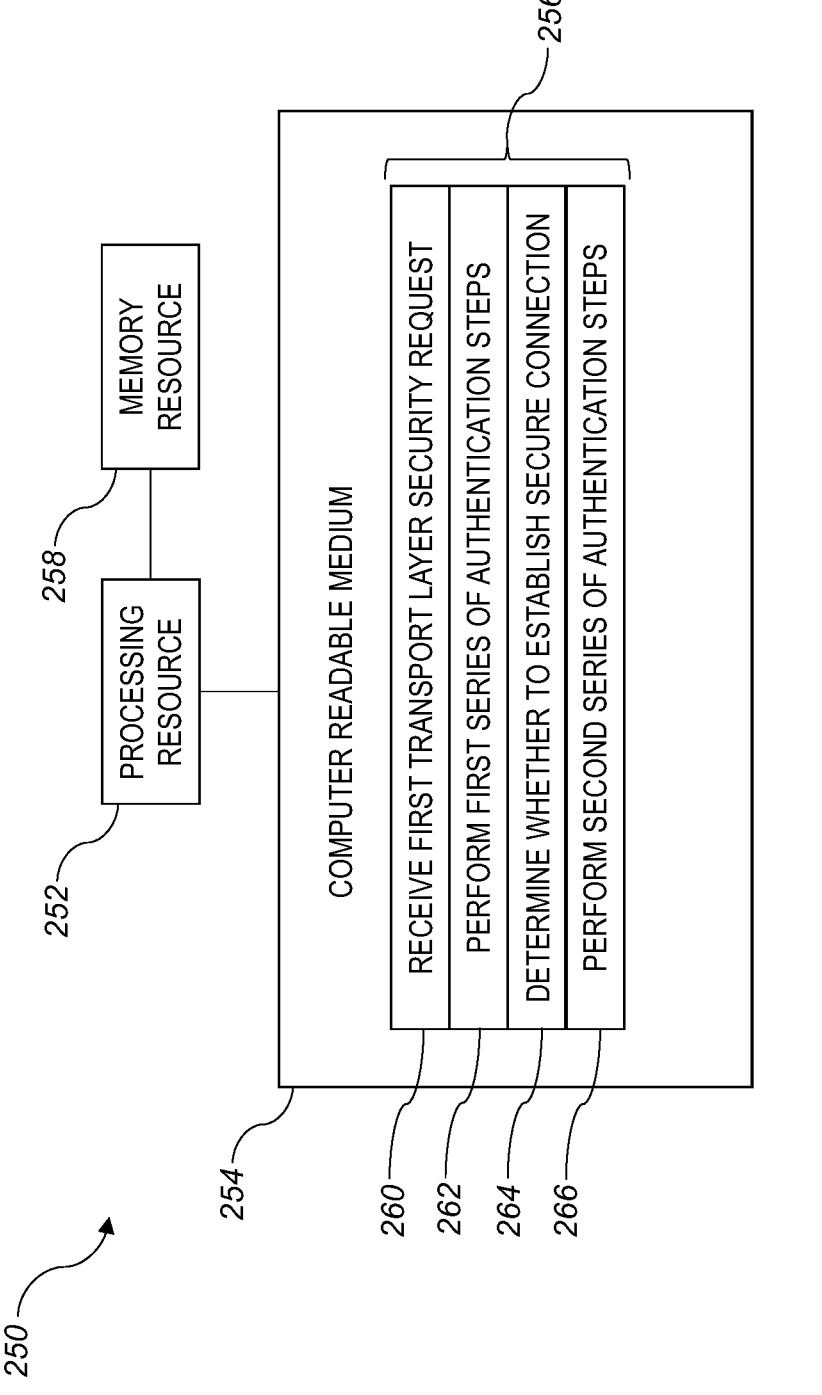
FIG. 6 depicts a system for performing authentication, in accordance with embodiments of the present disclosure.

FIG. 6 depicts a computer system 250 for performing authentication, in accordance with embodiments of the present disclosure. Embodiments of the present disclosure can include a computer system 250, as also discussed in relation to FIG. 1, which can utilize software, hardware, firmware, and/or logic to perform a number of functions. The computer system 250 can include a number of remote computing devices, in some embodiments.

The computer system 250 can be a combination of hardware and program instructions configured to perform a number of functions. The hardware, for example, can include one or more processing resources 252, computer readable medium (CRM) 254, etc. The program instructions (e.g., computer-readable instructions (CRI) 256) can include instructions stored on CRM 254 and executable by the processing resource 252 to implement a desired function (e.g., perform a second series of authentication steps related to the second transport layer security request utilizing the handshake memory of the transport layer security stack, in response to completion of the first series of authentication steps, etc.). The CRI 256 can also be stored in remote memory managed by a server and represent an installation package that can be downloaded, installed, and executed. The computer system 250 can include memory resources 258, and the processing resources 252 can be coupled to the memory resources 258.

Processing resources 252 can execute CRI 256, which can be stored on an internal or external non-transitory CRM 254. The processing resources 252 can execute CRI 256 to perform various functions, including the functions described with respect to FIG. 1 to FIG. 6.

A number of modules 260, 262, 264, 266, 268, 270 can be sub-modules or other modules. For example, the receive first transport layer security request module 260 and the perform first series of authentication steps module 262 can be sub-modules and/or contained within a single module. Furthermore, the number of modules 260, 262, 264, 266, can comprise individual modules separate and distinct from one another.

A receive first transport layer security request module 260 can comprise CRI 256 and can be executed by the processing resource 252 to receive, with a transport layer security stack of a microcontroller, a first transport layer security request from a first transport layer security stack of a microcontroller and a second transport layer security request from a second internal communication endpoint task. In some embodiments, the first and second transport layer security request can be received at a same time by a microcontroller that includes a communications module, as discussed herein. In some embodiments, the first transport layer security request can be related to establishing a secure connection with a first external communication endpoint and the second transport layer security request can be related to establishing a secure connection with a second external communication endpoint.

A perform first series of authentication steps module 262 can comprise CRI 256 and can be executed by the processing resource 252 to perform a first series of authentication steps related to the first transport layer security request, utilizing a handshake memory of the transport layer security stack. In some embodiments, performance of the authentication steps can be a memory intensive operation. Thus, embodiments of the present disclosure can include a handshake manager task, which can devote all of the transport layer security stack's handshake memory to performance of the first series of authentication steps and to each series of authentication steps performed thereafter.

A determine whether to establish secure connection module 264 can comprise CRI 256 and can be executed by the processing resource 252 to determine whether to establish a secure connection with the first external communication endpoint and the internal communication endpoint, in response to completion of the first series of authentication steps. As discussed herein, the decision of whether to establish a secure connection with the first external communication endpoint can be based on a handshake stage where the external communication endpoint and internal communication endpoint verify each other's credentials using symmetric keys (e.g., public/private key cryptography). Certificates associated with the internal communication endpoint and the external communication endpoint are validated against a root of trust. Upon validation of the certificates, session keys can be created utilizing symmetric cryptography, which can be used to encrypt/validate messages in a secure connection stage.

In some embodiments, although not depicted, a receive HTTP request module can comprise CRI 256 and can be executed by the processing resource 252 to receive an HTTP request with the internal communication endpoint, from the first external communication endpoint, in response to establishment of the secure connection. In some embodiments, the HTTP request can include a request to share static data with the external communication endpoint. In some embodiments, the handshake memory can be utilized in completing the request to share static data with the external communication endpoint. In some embodiments, a parse HTTP request module can comprise CRI 256 and can be executed by the processing resource 252 to parse the HTTP request with the handshake memory of the transport layer security stack. In some embodiments, all of the handshake memory can be utilized in receiving the HTTP request, with the transport layer security stack, from the first external communication endpoint and parsing the HTTP request with the handshake memory of the transport layer security stack.

A perform second series of authentication steps module 270 can comprise CRI 256 and can be executed by the processing resource 252 to perform a second series of authentication steps with the transport layer security stack related to the second transport layer security request utilizing the handshake memory of the transport layer security stack, in response to completion of the first series of authentication steps (parsing of the HTTP request, if one is received). In some embodiments, instructions can be executable by the processor to utilize all of the handshake memory to perform the second series of authentication steps, upon completion of the HTTP request being parsed. In some embodiments, the handshake memory can be released and the second series of authentication steps can be performed with the transport layer security stack related to the second transport layer security request, in response to the static data being shared with the external communication endpoint.

In some embodiments, as discussed herein, when an HTTP request is received, the HTTP request can further include, a request to switch protocols for additional handling of dynamic data. In some embodiments, the request to switch protocols for additional handling of dynamic data can be included with the HTTP request. In some embodiments, instructions can be executable to provide dynamic data to the client using a handshake memory of the transport layer security stack and to receive a message from the external communication endpoint to close the connection with the external communication endpoint.

In some embodiments, dynamic data can be provided to the external communication endpoint using a handshake memory of the transport layer security stack. In response to receipt of the dynamic data, in some embodiments, a message can be received from the first external communication endpoint to close the connection with the first external communication endpoint. In some embodiments, dynamic data can be provided to the external communication end-point using a protocol that includes WebSockets. In some embodiments, the second series of authentication steps related to the second transport layer security request can be performed with the transport layer security stack, using the handshake memory of the transport layer security stack, in response to the connection with the first external communication endpoint being closed.

Embodiments are described herein of various apparatuses, systems, and/or methods. Numerous specific details are set forth to provide a thorough understanding of the overall structure, function, manufacture, and use of the embodiments as described in the specification and depicted in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment", or the like, means that a particular feature, structure, or characteristic described in connection with the embodiment(s) is included in at least one embodiment. Thus, appearances of the phrases "in various embodiments," "in some embodiments," "in one embodiment," or "in an embodiment," or the like, in places throughout the specification, are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

Although at least one embodiment for transport layer security stack for resource constrained devices has been described above with a certain degree of particularity, those skilled in the art could make numerous alterations to the disclosed embodiments without departing from the spirit or scope of this disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the devices. Joinder references (e.g., affixed, attached, coupled, connected, and the like) are to be construed broadly and can include intermediate members between a connection of elements and relative movement between elements. As such, joinder references do not necessarily infer that two elements are directly connected and in fixed relationship to each other. It is intended that all matter contained in the above description or shown in the accompanying drawings shall be interpreted as illustrative only and not limiting. Changes in detail or structure can be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed:

1. A system for performing authentication, comprising:

a computing device comprising processor resources and memory resources, the memory resources storing computer-readable instructions that, when executed by the processor resources, cause the processor resources to:

receive, with a transport layer security stack of the computing device, a first transport layer security request from a first internal communication endpoint task and a second transport layer security request from a second internal communication endpoint task, wherein the first transport layer security request is related to establishing a secure connection with a first external communication endpoint and the second transport layer security request is related to establishing a secure connection with a second external communication endpoint;

in response to determining that at least one of the processor resources and memory resources available to the transport layer security stack are insufficient to concurrently process the first transport layer security and second transport layer security requests, perform a first series of authentication steps with the computing device related to the first transport layer security request;

store, in a handshake memory of the computing device, intermediate authentication state information generated during the first series of authentication steps;

determine whether to establish the secure connection between the first external communication endpoint and the computing device in response to completion of the first series of authentication steps;

defer execution of authentication steps for the second transport layer security request while performing the first series of authentication steps; and perform a second series of authentication steps with the computing device related to the second transport layer security request, in response to completion of the first series of authentication steps.

2. The system of claim 1, further comprising instructions executable to prioritize memory resources with respect to performance of the first series of authentication steps over the second series of authentication steps, until the first series of authentication steps has been completed.

3. The system of claim 2, wherein the instructions executable by the processor to complete the first series of authentication steps include instructions executable to determine, with the computing device, that credentials of the first external communication endpoint are trusted.

4. The system of claim 3, wherein the first internal communication endpoint task is located internally with respect to the computing device and forwards the first transport layer security request from the first external communication endpoint to the transport layer security stack.

5. The system of claim 2, wherein the first internal communication endpoint is located internally with respect to the computing device and initiates a request to establish the secure connection with the first external communication endpoint.

6. The system of claim 1, further comprising instructions executable by the processor to receive the first transport layer security request and the second transport layer security request at a same time.

7. The system of claim 6, further comprising instructions executable by the processor to prioritize the first transport layer security request over the second transport layer security request, based on a time stamp of when each one of the first transport layer security request and the second transport layer security request was received.

8. The system of claim 1, wherein the instructions executable to perform the first series of authentication steps with the computing device include instructions executable to utilize a handshake memory associated with the computing device to perform the first series of authentication steps.

9. The system of claim 8, further comprising instructions executable by the processor to dedicate all of the handshake memory to performing the first series of authentication steps.

10. The system of claim 9, further comprising instructions executable by the processor to release the handshake memory in response to completion of the first series of authentication steps.

11. The system of claim 10, further comprising instructions executable by the processor to dedicate all of the released handshake memory to performing the second series of authentication steps, in response to completion of the first series of authentication steps.

12. The system of claim 8, further comprising instructions executable by the processor to:

receive, with the computing device, a Hypertext Transfer Protocol (HTTP) request, from the first external communication endpoint, upon performing the first series of authentication steps, wherein the HTTP request includes a request to share static data with the first external communication endpoint; and parse the HTTP request with the handshake memory of the computing device and provide static data to the first external communication endpoint.

13. The system of claim 12, further comprising instructions executable by the processor to release the handshake memory upon parsing the HTTP request and provide the static data to the first external communication endpoint.

14. The system of claim 8, further comprising instructions executable by the processor to receive, with the computing device, a Hypertext Transfer Protocol (HTTP) request, from the first external communication endpoint, upon performing the first series of authentication steps, wherein the HTTP request includes a request to share dynamic data with the first external communication endpoint and a request to switch protocols for additional handling of dynamic data.

15. The system of claim 14, further comprising instructions executable by the processor to:

provide dynamic data to the client using a session memory of the computing device; and perform the second series of authentication steps with the computing device related to the second transport layer security request, using the handshake memory of the computing device.

16. The system of claim 15, wherein the step of providing dynamic data to the client is concurrent with the step of performing the second series of authentication steps.

17. The system of claim 15, further comprising instructions executable by the processor to provide the dynamic data to the client using a protocol that includes WebSockets.

18. A non-transitory computer readable medium storing instructions for performing authentication, the instructions executable by a processor, to:

receive, with a transport layer security stack of a microcontroller, a first transport layer security request from a first transport layer security stack of a microcontroller and a second transport layer security request from a second internal communication endpoint task, wherein the first transport layer security request is related to establishing a secure connection with a first external communication endpoint and the second transport layer security request is related to establishing a secure connection with a second external communication endpoint;

in response to determining that processor resources and/or memory resources available to the TLS stack are insufficient to concurrently process the first and second TLS requests, perform a first series of authentication steps related to the first transport layer security request, utilizing a handshake memory of the transport layer security stack;

store, in the handshake memory, intermediate authentication state information generated during the first series of authentication steps;

determine whether to establish a secure connection with the first external communication endpoint in response to completion of the first series of authentication steps;

defer execution of authentication steps for the second TLS request while performing the first series of authentication steps; and perform a second series of authentication steps related to the second transport layer security request utilizing the handshake memory of the transport layer security stack, in response to completion of the first series of authentication steps.

19. The non-transitory computer readable medium of claim 18, further comprising instructions executable by the processor to:

receive an HTTP request with the transport layer security stack, from the first external communication endpoint, in response to establishment of the secure connection;

parse the HTTP request with the handshake memory of the transport layer security stack, wherein the HTTP request includes a request to share static data with the first external communication endpoint.

20. The non-transitory computer readable medium of claim 19, further comprising instructions executable by the processor to utilize the handshake memory in completing the request to share static data with the first external communication endpoint.

21. The non-transitory computer readable medium of claim 20, further comprising instructions executable by the processor to release the handshake memory and perform the second series of authentication steps with the transport layer security stack related to the second transport layer security request, in response to the static data being shared with the first external communication endpoint and in response to parsing of the HTTP request.

22. The non-transitory computer readable medium of claim 19, further comprising instructions executable by the processor to:

receive an HTTP request with the transport security layer stack, from the first external communication endpoint, in response to establishment of the secure connection;

parse the HTTP request with the handshake memory of the transaction layer security stack; and receive, with the HTTP request, a request to switch protocols for additional handling of dynamic data.

23. The non-transitory computer readable medium of claim 18, further including instructions executable by the processor to utilize all of the handshake memory to perform the first series of authentication steps.

24. The non-transitory computer readable medium of claim 23, further including instructions executable by the processor to utilize all of the handshake memory to:

receive the HTTP request, with the transport layer security stack, from the first external communication endpoint; and parse the HTTP request with the handshake memory of the transport layer security stack.

25. The non-transitory computer readable medium of claim 24, further including instructions executable by the processor to utilize all of the handshake memory to perform the second series of authentication steps, upon completion of the HTTP request being parsed.

26. The non-transitory computer readable medium of claim 18, wherein the HTTP request includes a request to switch protocols and provide dynamic data.

27. The non-transitory computer readable medium of claim 26, further comprising instructions executable by the processor to:

provide dynamic data to the first external communication endpoint using a session memory; and receive a message from the first external communication endpoint to close the connection with the first external communication endpoint.

28. The non-transitory computer readable medium of claim 27, further comprising instructions executable to provide dynamic data to the first external communication endpoint using a protocol that includes WebSockets.

29. The non-transitory computer readable medium of claim 27, further comprising instructions executable by the processor to perform the second series of authentication steps with the transport layer security stack related to the second transport layer security request, using the handshake memory of the transport layer security stack, wherein the step of providing dynamic data to the client is concurrent with the step of performing the second series of authentication steps.

30. A method for performing authentication, comprising:

receiving, with a transport layer security stack, a plurality of transport layer security requests from a plurality of internal communication endpoint tasks, wherein the plurality of transport layer security requests are related to establishing a secure connection with a plurality of respective external communication endpoints;

determining that processor resources and/or memory resources available to the transport layer security stack are insufficient to concurrently process the plurality of transport layer security requests;

performing a first series of authentication steps related to a first one of the plurality of transport layer security requests received from a first one of the internal communication endpoint tasks, utilizing a handshake memory of the transport layer security stack;

storing, in the handshake memory, intermediate authentication state information generated during the first series of authentication steps;

deferring execution of authentication steps for at least a second one of the plurality of transport layer security requests while performing the first series of authentication steps;

determining whether to establish a secure connection with a first one of the plurality of external communication endpoints, in response to completion of the first series of authentication steps;

receiving an HTTP request with the transport layer security stack, from the first one of the plurality of external communication endpoints, in response to establishment of the secure connection, along with a request to provide static data to the first one of the plurality of external communication endpoints;

parsing the HTTP request with the handshake memory of the transport layer security stack and providing the static data to the first one of the plurality of external communication endpoints; and performing a second series of authentication steps with the transport layer security stack related to a second one of the plurality of transport layer security requests utilizing the handshake memory of the transport layer security stack, in response to the static data being provided to the first one of the plurality of external communication endpoints, after completion of the first series of authentication steps, and after reallocation of the processor resources and/or memory resources.

31. The method of claim 30, further comprising:

receiving a message from the first one of the plurality of external communication endpoints to close the secure connection between the transport layer security stack and the first one of the plurality of external communication endpoints; and performing the second series of authentication steps in response to the secure connection with the first one of the plurality of external communication endpoints being closed.

32. The method of claim 30, further comprising utilizing all of the handshake memory in establishing the secure connection, parsing the HTTP request, and providing the static data to the first one of the plurality of external communication endpoints.

33. A system for performing authentication, comprising:

a computing device comprising processor resources and memory resources, the memory resources storing computer-readable instructions that, when executed by the processor resources, cause the processor resources to:

receive, with a transport layer security stack of the computing device, a first transport layer security request from a first internal communication endpoint task and a second transport layer security request from a second internal communication endpoint task, wherein the first transport layer security request is related to establishing a secure connection with a first external communication endpoint and the second transport layer security request is related to establishing a secure connection with a second external communication endpoint;

perform a first series of authentication steps with the computing device related to the first transport layer security request, utilizing allocated memory of the memory resources, the allocated memory being first allocated exclusively to performing the first series of authentication steps;

determine whether to establish the secure connection between the first external communication endpoint and the computing device in response to completion of the first series of authentication steps;

release the allocated memory after completion of the first series of authentication steps; and perform a second series of authentication steps with the computing device related to the second transport layer security request, utilizing the released allocated memory.

* * * * *